United States Patent

Bosio

Patent Number: 6,068,289
Date of Patent: May 30, 2000

[54] COMPRESSED GAS ACCUMULATOR FOR A VEHICLE OCCUPANT RESTRAINT SYSTEM AND GAS BAG MODULE

[75] Inventor: Allen C. Bosio, Aschaffenburg, Germany

[73] Assignee: TRW Occupant Restraint Systems GmbH & Co. KG, Alfdorf, Germany

[21] Appl. No.: 08/940,521

[22] Filed: Sep. 30, 1997

[30] Foreign Application Priority Data

Oct. 9, 1996 [DE] Germany ............ 296 17 587 U

[51] Int. Cl.[7] ............ B60R 21/26
[52] U.S. Cl. ............ 280/736; 280/742
[58] Field of Search ............ 280/741, 742, 280/736, 737

[56] References Cited

U.S. PATENT DOCUMENTS

| | | |
|---|---|---|
| 3,638,964 | 2/1972 | Chute . |
| 3,733,180 | 5/1973 | Heineck et al. ............ 280/742 |
| 5,195,777 | 3/1993 | Cuevas . |
| 5,388,859 | 2/1995 | Fischer et al. ............ 280/740 |

FOREIGN PATENT DOCUMENTS

| | | |
|---|---|---|
| 4234276 | 10/1992 | Germany . |
| 2287776 | 9/1995 | United Kingdom . |

OTHER PUBLICATIONS

XP 000680925 39126, Air Bag Inflator Having a Variable Area Gas Exit Orifice (3 pgs), Nov. 1996.

*Primary Examiner*—Paul N. Dickson
*Attorney, Agent, or Firm*—Tarolli, Sundheim, Covell, Tummino & Szabo L.L.P.

[57] ABSTRACT

A compressed gas accumulator for a vehicle occupant restraint system comprises an accumulator container in which gas is stored for a long time at high pressure, a pyrotechnical charge, and at least one gas exit port. The exit port is opened by activation of the pyrotechnical charge in response to an activating signal to enable the compressed gas to emerge from the accumulator container. The gas exit port has a flow cross-section and at least one wall at least partly rimming the exit port. At least a portion of the wall is of a material which is attacked by the gas in the course of gas exit by erosion and/or combustion so that the flow cross-section of the gas exit port is increased to a degree which is at least approximately predetermined.

1 Claim, 3 Drawing Sheets

COMPRESSED GAS ACCUMULATOR FOR A VEHICLE OCCUPANT RESTRAINT SYSTEM AND GAS BAG MODULE

FIELD OF THE INVENTION

The invention relates to a compressed gas accumulator for a vehicle occupant restraint system and a gas bag module comprising a compressed gas accumulator.

BACKGROUND OF THE INVENTION

Known compressed gas accumulators comprise an accumulator container in which gas is stored for a long time at high pressure which is released by activation of a pyrotechnical charge in response to an activating signal.

Compressed gas accumulators, particularly for inflating a gas bag in a vehicle are opened in a crash situation so that gas stored therein emerges therefrom and inflates the gas bag. It is required that the gas bag is fully deployed within a very short period of time, which necessitates a high gas pressure for quick filling. However, an initially high gas pressure may be obstructive for commencement of the deployment action of the gas bag when the latter is still to emerge from its cover or the gas bag module, which is something that hitherto could not be avoided.

BRIEF SUMMARY OF THE INVENTION

The invention defines a compressed gas accumulator in which the evolution of the flow of gas emerging changes during the emerging process without technically complicated control means being provided. The compressed gas accumulator according to the present invention comprises an accumulator container in which gas is stored for a long time at high pressure, a pyrotechnical charge, and at least one gas exit port. The exit port is opened by activation of the pyrotechnical charge in response to an activating signal to enable the compressed gas to emerge from the accumulator container. The gas exit port has a flow cross-section and at least one wall at least partly rimming the exit port. At least a portion of the wall is of a material which is attacked by the gas in the course of gas exit by at least one of erosion and combustion so that the flow cross-section of the gas exit port is increased to a degree which is at least approximately predetermined.

According to the invention the physical and/or chemical properties of the gas on it being released and the properties of the material at least partly rimming the gas exit port are adapted to each other such that this material is attacked in the course of the gas exit by erosion or combustion or by both, errosion and combustion. Depending on the selected material, the geometry and the configuration of the wall in conjunction with the parameters of the emerging gas (e.g. gas pressure or gas temperature) the evolution of the increase in the cross-sectional area can be predetermined relatively precisely with time so that the pressure responses are attainable which satisfy contradictory requirements and were unattainable with a conventional compressed gas accumulator.

The depletable or destructable wall is formed preferably by a diffusor screen secured to the accumulator container. The accumulator container itself can thus always be configured the same, whereas the diffusor screen can be adapted to the desired response in the change of the cross-sectional area. The wall may consist of a single material or several materials. For instance, at least one ring-shaped insert of erodible and/or combustible material may be provided which limits the gas exit port and which ensures the desired response in the change of the cross-sectional area with time.

Several ring-shaped layers of differing materials rimming the gas exit port may also be correspondingly provided in sequence which have different resistance with respect to the erosion and/or combustion due to the emerging gas. When a non-erodible and/or non-combustible material adjoins the erodible and/or combustible material outwardly the compressed gas accumulator features during gas exit a constant exit cross-sectional area as soon as the material nearer to the gas exit port has been removed.

The gas bag module according to the invention for a vehicle occupant restraint system, comprising a gas bag and a compressed gas accumulator container in accordance with the invention, is configured so that the change in the cross-sectional area of the gas exit port and the exit gas flow are adapted to the gas bag volume such that the curve profile of the gas bag internal pressure with time is initially flat and subsequently very steep. On commencement of deployment the gas bag internal pressure does not increase too rapidly so that folded gas bag sections cannot also jam each other.

DETAILED DESCRIPTION OF PREFERRED EMBODIMENTS

Figure 1:
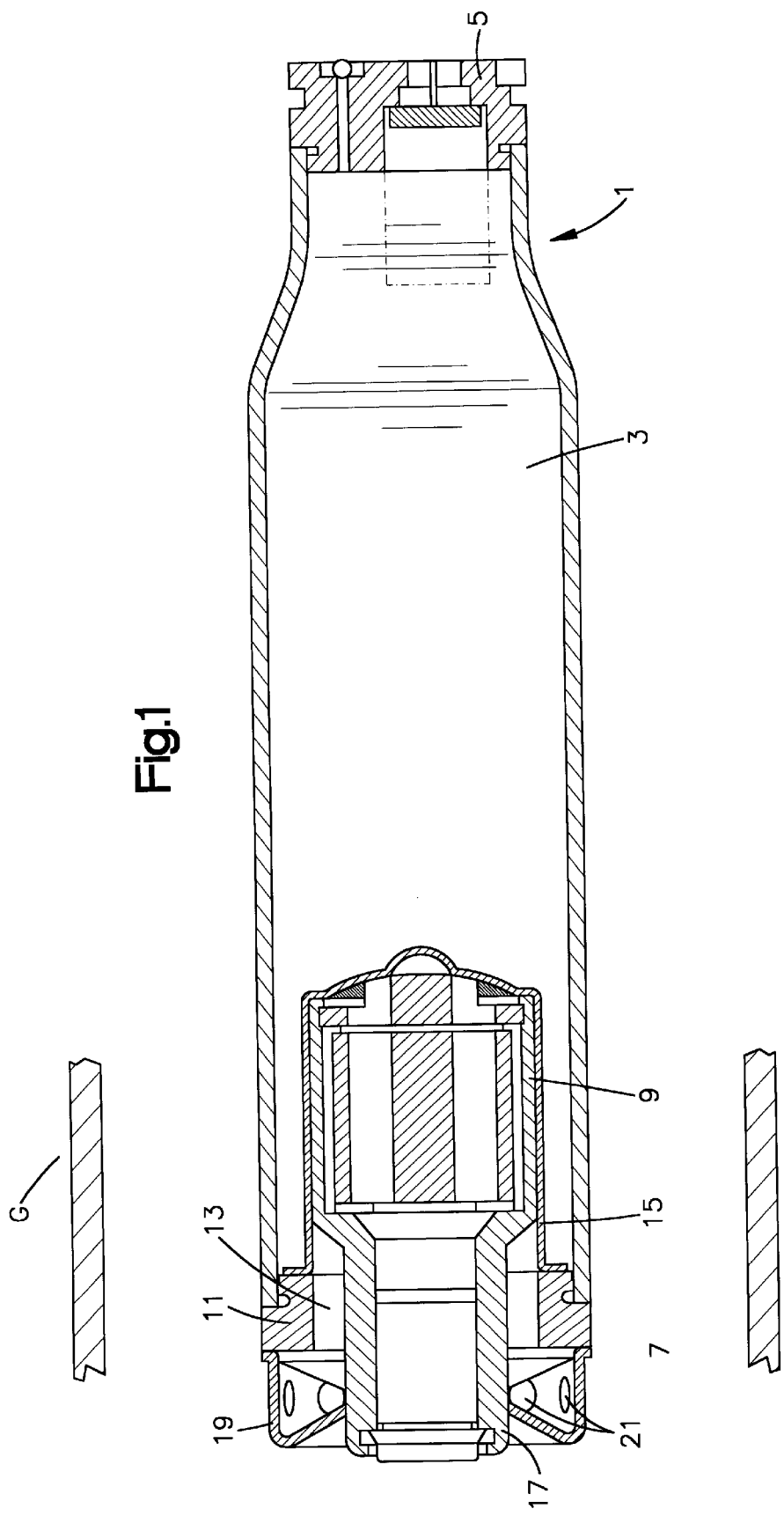
FIG. 1 shows the gas bag module according to the invention with a compressed gas accumulator in accordance with the invention in longitudinal section.

In FIG. 1 a gas bag module having a compressed gas accumulator is shown which serves to inflate a gas bag G. In the interior of the accumulator container 1, a chamber 3 filled with a noble gas such as argon and helium or with air is located. The noble gas or the air in the chamber 3 is subjected to a pressure of more than 200 bar. Located opposite an exit end 7 is a charging end 5. From the exit end an igniter 9 protrudes into the interior of the chamber 3. The igniter 9 comprises a pyrotechnical charge which is ignited by a signal in a crash situation. The end wall 11 at the exit end 7 includes several gas exit passageways 13 evenly distributed about the circumference which, in the non-activated condition, are closed with respect to the chamber 3 by a wall 15 extending up to igniter 9. Mounted on a connecting pin 17 of the igniter 9 protruding from the end wall 11 is a diffusor screen 19 having numerous gas exit ports 21, of which only one is shown magnified in FIG. 2.

The accumulator container 1 protrudes by this diffusor screen 19 into the interior of gas bag G and forms therewith a gas bag module.

Each gas exit port 21 is defined by a circular ring-shaped wall 23. This wall 23 consists of a section 25 connected integrally to the diffusor screen 19 protruding radially inwardly with an annular groove 27 facing the gas exit port 21. The wall 23 includes further a ring-shaped insert 29 of a compacted ceramic material which extends into the annular groove 27 so that the insert 29 is axially prevented from shifting in position with respect to the section 25. Alternatively, the insert 29 may also consist of a plastics material. The edge closing off the gas exit port 21 is semi-circular cross-sectionally.

The functioning of the compressed gas accumulator will now be explained. In a crash situation the pyrotechnical charge contained in the igniter 9 is ignited so that additional gas flows into the interior of the chamber 3, as a result of which the pressure in the chamber 3 is increased to such an extent that the wall 15 breaks and gas flows through the gas exit passageways 13 into the diffusor screen 19 and via the gas exit ports 21 into the interior of the gas bag. Due to the gas flowing at high pressure through the gas exit ports 21 the insert 29 is eroded by the compressed powder ceramic material being depleted so that the cross-sectional area of the gas exit ports 21 is enlarged during the exit flow. At the start of gas exit the gas exit port 21 still has a diameter d. The cross-sectional area of the gas exit port 21 quickly increases during gas exit until the complete insert 29 is depleted up to the section 25 which is made of a more stable material and which cannot be eroded. The gas exit port 21 then has a diameter D.

Figure 2:
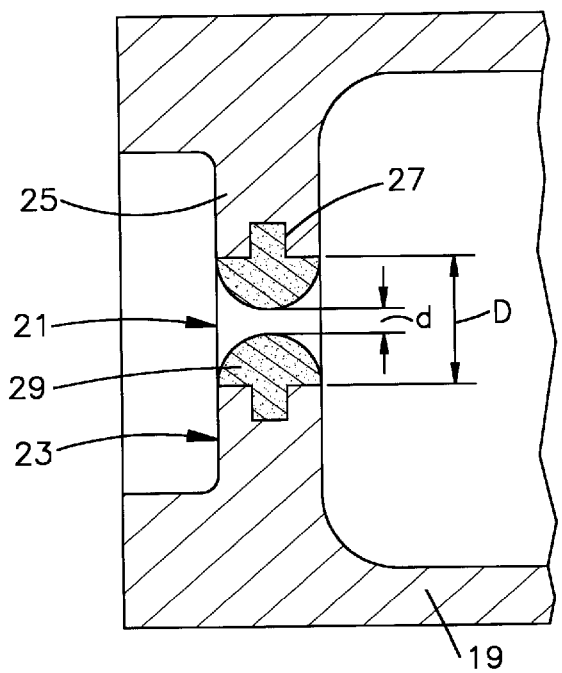
FIG. 2 is a longitudinal section through a screen of the compressed gas accumulator of FIG. 1 having an erodible and/or combustible wall.

The evolution of enlarging of the cross-sectional area of the gas exit port 21 during gas exit depends on the material of insert 29 and that of the section 25 which, where necessary, may also be depleted, as well as on the geometry of the wall 23 as a whole. In the case of a semi-circular cross-section of the insert 29, as is represented in FIG. 2, increasingly more material needs to be depleted from the insert 29 during gas exit with increasing width of the insert 29 to enlarge the cross-sectional area of the gas exit port 21. In the case of an insert e.g. acutely coned radially inwards an even faster increase in the cross-sectional area of the gas exit port 21 could be achieved, whereas an insert 29 having a rectangular cross-section ensures a consistent, but slower increase in the cross-sectional area during gas exit since the width of the insert 29 does not change.

Figure 3:
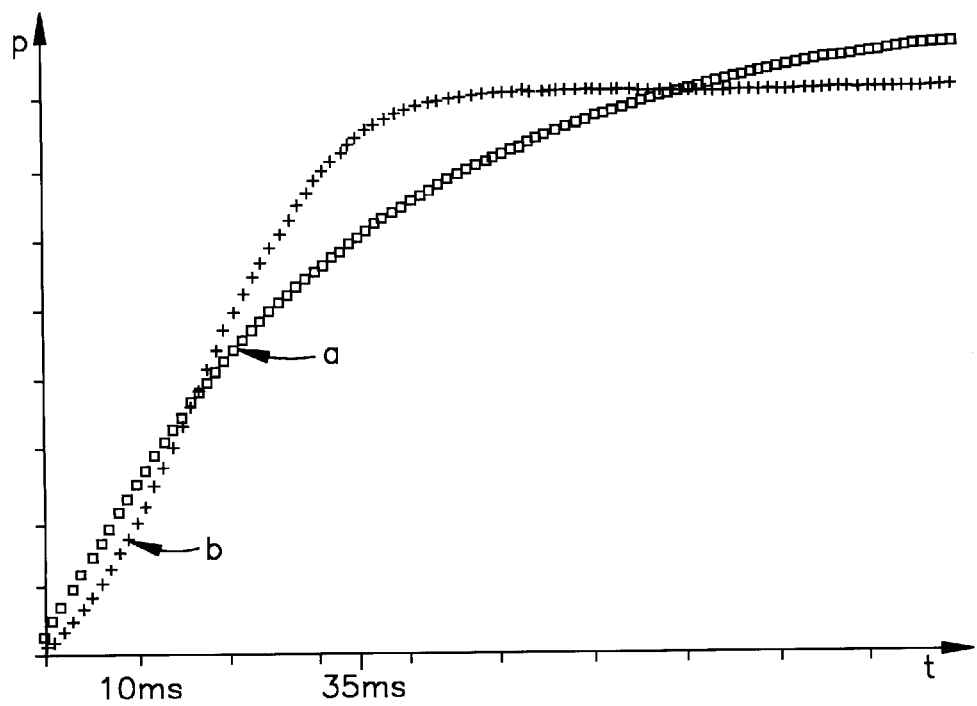
FIG. 3 is a graph plotting the pressure profile with time in the interior of a gas bag inflated by means of a conventional and a compressed gas accumulator in accordance with the invention.

By the material selection and the geometry of the wall 23, the physical and/or chemical properties of the gas emitted and the geometry of the gas bag, predetermined responses of the gas bag internal pressure are achievable by simple means. In FIG. 3 the change in time of the gas bag internal pressure is plotted, the curve identified a representing the response of the gas bag internal pressure when employing a hitherto conventional compressed gas accumulator featuring gas exit ports having a cross-sectional area with no change, and the curve identified b representing the corresponding response when using the compressed gas accumulator shown in FIGS. 1 and 2. When using conventional compressed gas accumulators the gas bag internal pressure initially increases linearly and slowly attains a maximum as the curve evens out. This response is of a disadvantage, since at the start of deployment of the gas bag no such high pressure should exist, whereas a high gas bag internal pressure should quickly materialize to fill the gas bag as quickly as possible. The preferred curve profile, which is preferably an S-shaped curve profile, is achievable by the compressed gas accumulator having erodible gas exit ports 21 in which the cross-sectional area of each gas exit port 21 is enlarged increasingly. As evident from FIG. 3 the pressure in the interior of the gas bag in the case of employing such a compressed gas accumulator more quickly attains the maximum pressure than when using a hitherto conventional compressed gas accumulator, although the pressure at the start of deployment of the gas bag in this case, until the latter emerges from the cover approximately 10 ms after ignition, is smaller than in the case of conventional compressed gas accumulators. Already roughly 35 ms after ignition the gas bag inflated by the compressed gas accumulator according to the invention attains its maximum internal pressure.

The enlargement in the cross-sectional area must not necessarily be achievable only by erosion. When the chamber 3 contains a gas which is strongly heated e.g. by a chemical reaction with the gas generated by the charge, the wall 23 may also be eroded and additionally combustioned. In this case the gas contained in the chamber 3 may be a mixture of air and 12% hydrogen, the annular insert 29 and the section 25 consisting thereby of an aluminum-magnesium alloy which is combustioned by the resulting heat and melts in part, and thus being exposed to erosion.

Due to the combustion of the wall 23 the exit gas is additionally heated and expands, which is desirable, to boost the performance of the compressed gas accumulator.

Figure 4:
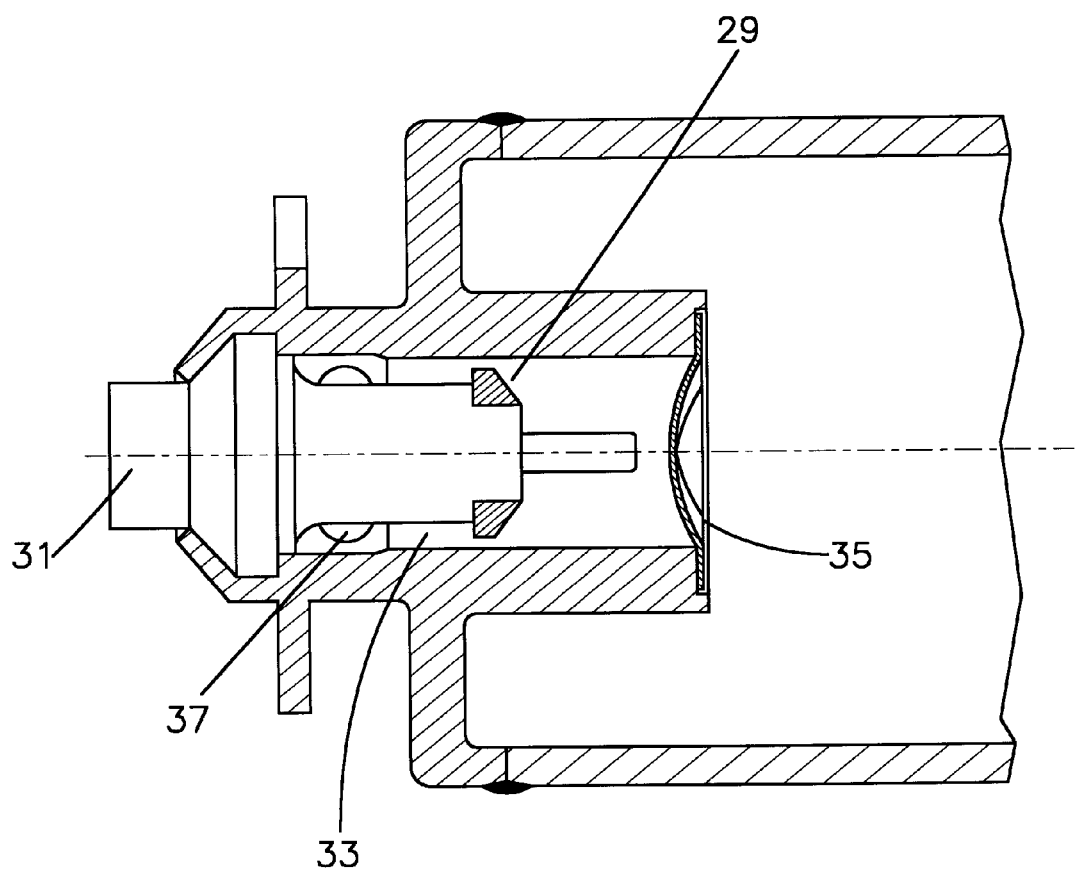
FIG. 4 is a longitudinal section through the exit end of a further embodiment of the compressed gas accumulator in accordance with the invention.

In the embodiment shown in FIG. 4 an igniter 31 is provided which is inserted in an exit channel 33. The insert 29 disposed on the outside of the igniter 31 defines the smallest gas flow cross-section, which is annular. On activation of the igniter 31, a diaphragm 35 sealing the chamber 3 is destroyed. The compressed gas then flows past insert 29, which acts as a screen, erodes or combustions it and reaches the gas bag via ports 37.

I claim:

1. A gas bag module for a vehicle occupant restraint system, comprising a gas bag of a volume in the inflated state and a compressed gas accumulator, said accumulator including an accumulator container in which gas is stored for a long time at high pressure, a pyrotechnical charge, and at least one gas exit port, said accumulator being opened by activation of said pyrotechnical charge in response to an activating signal to enable a gas exit flow of said compressed gas to emerge from said accumulator container via said gas exit port, said gas exit port having a flow cross-section and at least one wall at least partly rimming said exit port, at least a portion of said wall being of a material which is attacked by said gas in the course of gas exit by at least one of erosion and combustion so that said flow cross-section of said gas exit port is increased to a degree which is at least approximately predetermined, the change in said flow cross-section of said gas exit port and said exit gas flow being adapted to the gas bag volume such that an initially flat and subsequently steep S-shaped curve profile of the gas bag internal pressure materializes with time, wherein said wall comprises a closure rim, said rim defining a plane and having a cross-section perpendicular to said plane, said cross-section being of a semi-circular shape.

* * * * *